United States Patent
Heaton et al.

(10) Patent No.: US 11,982,240 B2
(45) Date of Patent: May 14, 2024

(54) AMMONIA FUELLED ENGINE

(71) Applicant: Perkins Engines Company Limited, Peterborough (GB)

(72) Inventors: David M. Heaton, Peterborough (GB); Mark J. Kennedy, Nottingham (GB)

(73) Assignee: Perkins Engines Company Limited, Peterborough (GB)

( * ) Notice: Subject to any disclaimer, the term of this patent is extended or adjusted under 35 U.S.C. 154(b) by 0 days.

(21) Appl. No.: 18/135,299

(22) Filed: Apr. 17, 2023

(65) Prior Publication Data

US 2023/0349334 A1 Nov. 2, 2023

(30) Foreign Application Priority Data

Apr. 29, 2022 (GB) ..................................... 2206313

(51) Int. Cl.
*F02M 31/18* (2006.01)
*F02D 19/06* (2006.01)
*F02M 21/02* (2006.01)

(52) U.S. Cl.
CPC ..... *F02D 19/0644* (2013.01); *F02D 19/0605* (2013.01); *F02D 19/0671* (2013.01);
(Continued)

(58) Field of Classification Search
CPC ............. F01N 2240/30; F02D 19/0644; F02D 19/0671
See application file for complete search history.

(56) References Cited

U.S. PATENT DOCUMENTS

| 7,574,993 B2 | 8/2009 | Gillespie et al. |
| 8,370,049 B1 | 2/2013 | Shimizu et al. |
| (Continued) | | |

FOREIGN PATENT DOCUMENTS

| CN | 101538010 | 9/2009 |
| CN | 114183275 A | 3/2022 |
| (Continued) | | |

OTHER PUBLICATIONS

Great Britain Search Report related to Application No. 2206313.5; reported on Oct. 19, 2022.
(Continued)

*Primary Examiner* — Jonathan R Matthias

(57) ABSTRACT

An internal combustion engine assembly comprising a fuel reformer, a combustion chamber and a controller. The fuel reformer comprises a first channel and a second channel, a portion of the second channel being adjacent to a portion of the first channel to facilitate heat exchange between the first and second channels. The first channel comprises a catalyst selected to reform ammonia to hydrogen and nitrogen. The first channel is configured to receive ammonia, pass the ammonia over the catalyst and output a first mixture comprising ammonia, hydrogen and nitrogen. The composition of the first mixture depends on a first reformer temperature of the first channel. The combustion chamber is configured to receive the first mixture from the fuel reformer; to receive an oxidant; to combust the first mixture in the oxidant to produce heat and a first product; and to output the first product. The second channel of the fuel reformer is configured to receive the first product.

15 Claims, 17 Drawing Sheets

(52) U.S. Cl.
CPC ........ *F02M 21/0206* (2013.01); *F02M 31/18* (2013.01); *F01N 2240/02* (2013.01); *F01N 2240/30* (2013.01)

(56) References Cited

U.S. PATENT DOCUMENTS

| | | |
|---|---|---|
| 8,904,994 B2 | 12/2014 | Michikawauchi et al. |
| 9,249,720 B2 | 2/2016 | Miyagawa |
| 2002/0155039 A1* | 10/2002 | Itoh ..................... F01N 3/023 |
| | | 422/177 |
| 2011/0114069 A1 | 5/2011 | Grannell et al. |
| 2011/0265463 A1 | 11/2011 | Kojima et al. |
| 2011/0283959 A1 | 11/2011 | Aso et al. |
| 2011/0283960 A1 | 11/2011 | Hikazudani et al. |
| 2012/0004830 A1 | 1/2012 | Miyagawa et al. |
| 2013/0025547 A1 | 1/2013 | Nakagawa et al. |
| 2014/0311428 A1* | 10/2014 | Miyagawa .............. F01N 3/106 |
| | | 123/3 |

FOREIGN PATENT DOCUMENTS

| | | |
|---|---|---|
| EP | 2573376 A1 | 3/2013 |
| JP | H05332152 | 12/1993 |
| JP | 2020159259 A | 10/2020 |
| WO | 2021242111 A1 | 12/2021 |

OTHER PUBLICATIONS

European Extended Search Report for Europe Patent Appln. No. 23168327.7, dated Sep. 28, 2023 (8 pgs).

\* cited by examiner

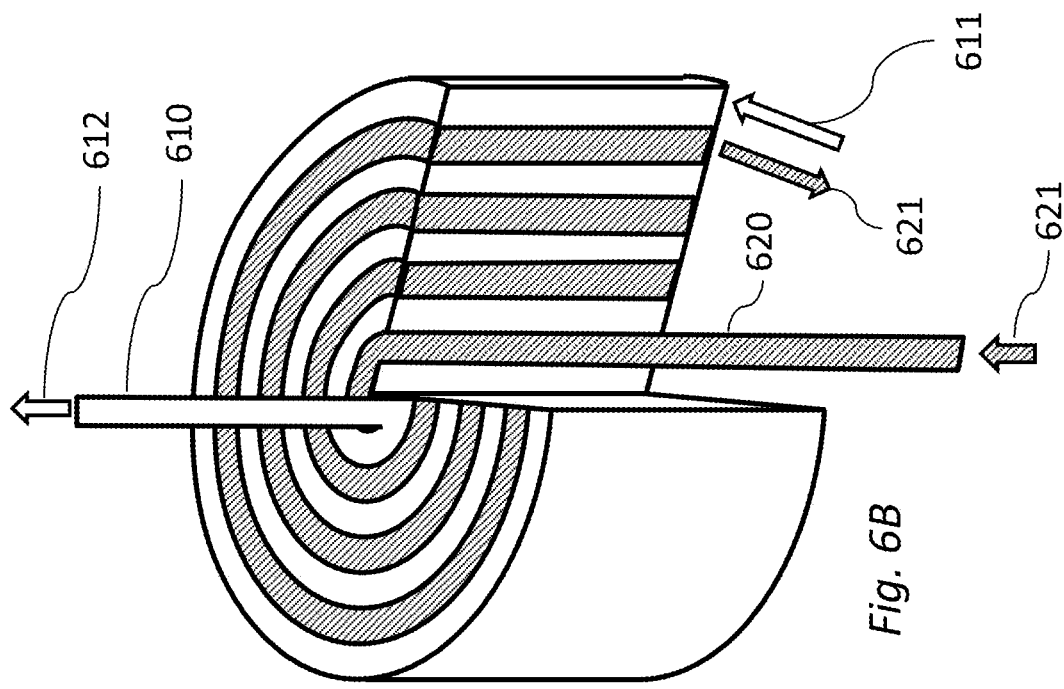
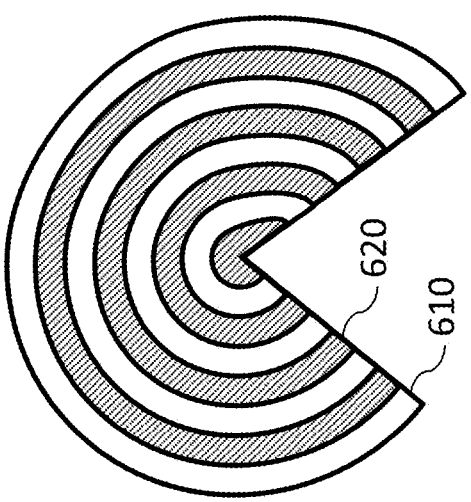
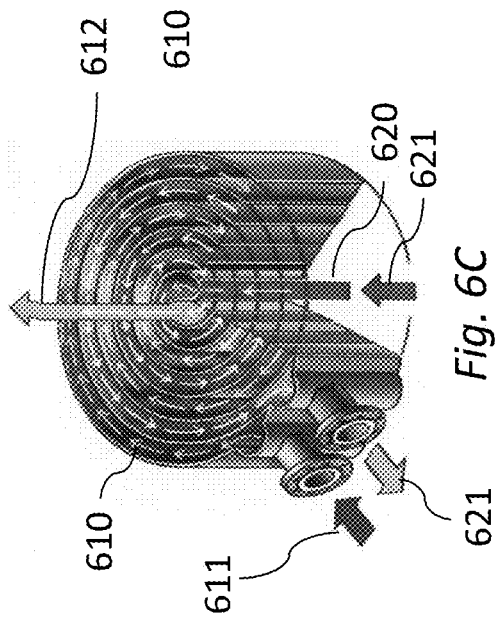
Fig. 6

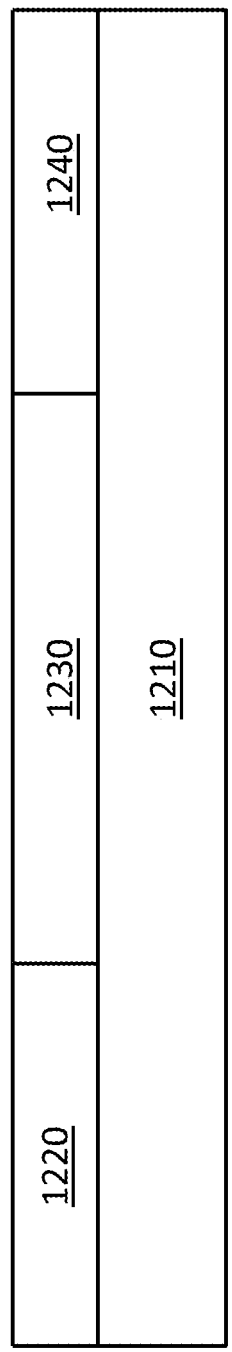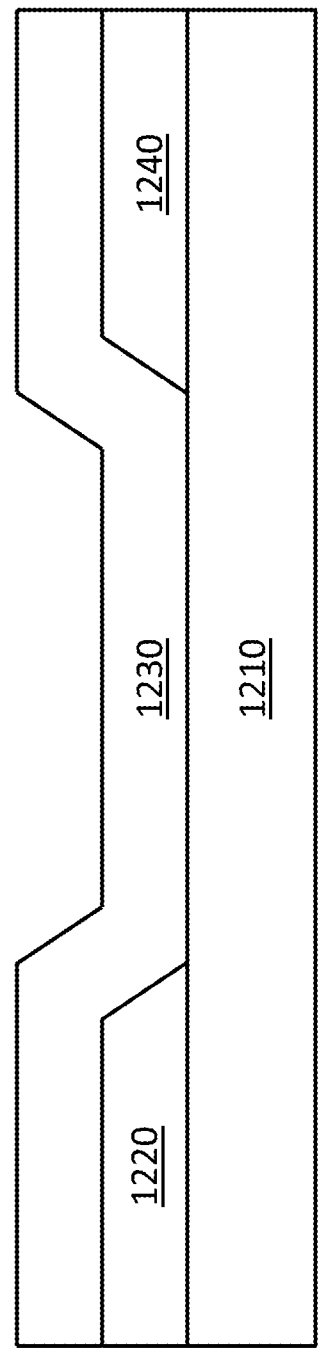

AMMONIA FUELLED ENGINE

CROSS-REFERENCE TO RELATED APPLICATION

This application claims priority under 35 USC § 119 and the Paris Convention to Great Britain Patent Application 22063115 filed on Apr. 29, 2022.

FIELD OF THE DISCLOSURE

The disclosure relates to the field of engines.

BACKGROUND

As an alternative to conventional hydrocarbon (HC) fueled engines, there is increased interest in hydrogen ($H_2$) fueled engines. Hydrogen has good combustion characteristics, and the combustion of hydrogen with oxygen produces only water vapour as the product.

Although combustion of hydrogen is carbon free, the method of hydrogen production is also a factor in the carbon footprint of the fuel. Locations that are suitable for producing hydrogen using renewable energy sources, such as by solar or wind power, are often remote and so the hydrogen is transported over long distances to where the fuel is required. Compressing hydrogen requires high energies and even in liquid form the energy density is relatively low, making hydrogen relatively inefficient to transport. Furthermore, the small molecular size of hydrogen makes it difficult to prevent leaks. If any hydrogen gas were to escape, it may form a potentially explosive mixture with air.

Burning hydrogen does not produce any carbon based pollutants; however, the combustion of hydrogen in air does produce oxides of Nitrogen ($NO_x$) which have an undesirable environmental impact.

Ammonia ($NH_3$) is an alternative renewable fuel for use in combustion engines, and is easier than hydrogen to transport. This is because ammonia is easier than hydrogen to store as a liquid under pressure, at higher energy density and lower pressures. Ammonia also requires less energy to compress to a liquid than hydrogen. Although leaks are less likely than for hydrogen, if any were to leak the smell of the ammonia reduces the risk of the leak going undetected. Also, ammonia gas is far less flammable than hydrogen. However, the combustion characteristics of ammonia are less favourable than hydrogen as it burns relatively slowly under a narrow range of mixtures, and unburnt ammonia emissions can be high. $NO_x$ may also be produced.

SUMMARY OF THE DISCLOSURE

Against this background, there is provided: an internal combustion engine assembly comprising a fuel reformer and a combustion chamber and a controller. The fuel reformer comprises a first channel and a second channel, a portion of the second channel being adjacent to a portion of the first channel to facilitate heat exchange between the first channel and the second channel. The first channel comprises a first reformer inlet, a catalyst selected to reform ammonia to hydrogen and nitrogen, and a first reformer outlet. The second channel comprises a second reformer inlet and a second reformer outlet. The fuel reformer is configured to (a) receive ammonia via the first reformer inlet; (b) pass the ammonia over the catalyst; and (c) output a first mixture comprising ammonia, hydrogen and nitrogen via the first reformer outlet, wherein the composition of the first mixture depends on a first reformer temperature of the first channel. The combustion chamber comprises a first chamber inlet and a first chamber outlet; wherein the combustion chamber is configured to (a) receive via the first combustion chamber inlet the first mixture from the first reformer outlet; (b) receive an oxidant; (c) combust the first mixture in the oxidant to produce heat and a first product; and (d) output the first product from the combustion chamber via the first chamber outlet. The fuel reformer is further configured to receive the first product via the second reformer inlet such that the first reformer temperature of the first channel depends on a temperature of the first product in the second channel. The controller is configured to control operation of the internal combustion engine assembly such that engine load exceeds a load threshold.

In this way, the internal combustion engine assembly may run on a mixture of hydrogen and ammonia, the composition of which may be controlled by adjusting the temperature of the fuel reformer.

There is also provided: a method of operating an internal combustion engine comprising a fuel reformer and a combustion chamber and a controller. The fuel reformer comprises a first channel and a second channel, a portion of the second channel being adjacent to a portion of the first channel to facilitate heat exchange between the first channel and the second channel. The first channel comprises a first reformer inlet, a catalyst selected to reform ammonia to hydrogen and nitrogen, and a first reformer outlet. The second channel comprises a second reformer inlet and a second reformer outlet. The combustion chamber comprises a first chamber inlet and a first chamber outlet. The method comprises:
(a) receiving ammonia via the first reformer inlet;
(b) passing the ammonia over the catalyst; and
(c) outputting a first mixture comprising ammonia, hydrogen and nitrogen via the first reformer outlet, wherein the composition of the first mixture depends on a first reformer temperature of the first channel;
(d) receiving via the first combustion chamber inlet the first mixture from the first reformer outlet;
(e) receiving in the combustion chamber an oxidant;
(f) combusting the first mixture in the oxidant to produce heat and a first product;
(g) outputting the first product from the combustion chamber via the first chamber outlet; and
(h) receiving the first product via the second reformer inlet such that the first reformer temperature of the first channel depends on a temperature of the first product in the second channel.

The controller is configured to control operation of the internal combustion engine assembly such that engine load exceeds a load threshold.

BRIEF DESCRIPTION OF THE DRAWINGS

A specific embodiment of the disclosure will now be described, by way of example only, with reference to the accompanying drawings in which:

FIG. 6 shows a schematic diagram of the first channel and the second channel of the fuel reformer according to an embodiment of the present disclosure, with a section removed to allow the interior to be shown. FIG. 6A shows a top view, FIG. 6B shows a perspective view and FIG. 6C shows a perspective view.

FIG. 11 shows graphs of temperature and concentrations of the gases passing through the aftertreatment system against time, in accordance with an embodiment of the present disclosure. All graphs in FIG. 11 show temperature against time.

FIG. 12 shows a schematic block diagram of a cross section of an aftertreatment system in accordance with an embodiment of the present disclosure. FIG. 12A shows a coating of the first ammonia oxidation catalyst in the first catalyst zone, a coating of the first SCR catalyst in the second catalyst zone and a coating of the second ammonia oxidation catalyst in the third catalyst zone. FIG. 12B shows a coating of the first ammonia oxidation catalyst in the first catalyst zone, a coating of the second ammonia oxidation catalyst in the third catalyst zone, and a coating of the first SCR catalyst over the first, second and third catalyst zones.

DETAILED DESCRIPTION

Figure 1:
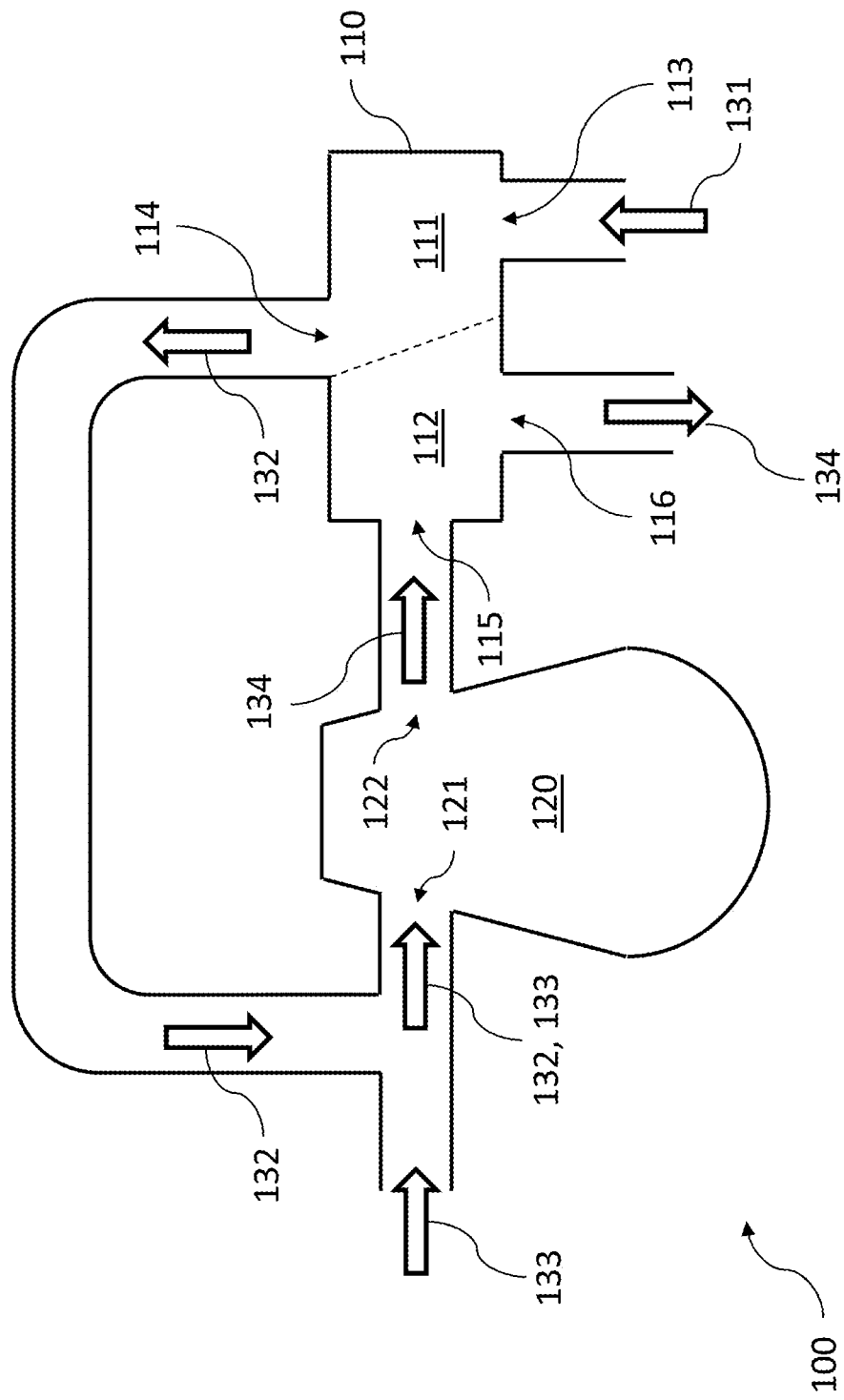
FIG. 1 shows a schematic diagram of an internal combustion assembly according to an embodiment of the present disclosure.

With reference to FIG. 1, an internal combustion engine assembly 100 according to this disclosure comprises a fuel reformer 110, a combustion chamber 120 and a controller. The fuel reformer 110 comprises a first channel 111 and a second channel 112. FIG. 1 illustrates the first channel 111 and second channel 112 as being separated by a dashed line. The first channel 111 and second channel 112 may have different geometries to those illustrated. There may be no fluid exchange between the first channel 111 and the second channel 112 in the fuel reformer 110. A portion of the second channel 112 is adjacent to a portion of the first channel 111 to facilitate heat exchange between the first channel 111 and the second channel 112. The first channel 111 comprises a first reformer inlet 113 and a first reformer outlet 114. The first channel further comprises a catalyst selected to reform ammonia to hydrogen and nitrogen. The second channel 112 comprises a second reformer inlet 115 and a second reformer outlet 116.

The fuel reformer 110 is configured to receive ammonia (indicated by arrow 131) via the first reformer inlet 113. The fuel reformer 110 is configured to pass the ammonia 131 over the catalyst, and to output, via the first reformer outlet 114, a first mixture (indicated by arrows 132) of ammonia, hydrogen and nitrogen. The composition of the first mixture 132 depends on a first reformer temperature of the first channel 111.

The combustion chamber 120 comprises a first chamber inlet 121 and a first chamber outlet 122. The combustion chamber 120 is configured to receive via the first combustion chamber inlet 121 the first mixture 132 from the first reformer outlet 114. The combustion chamber 120 is further configured to receive an oxidant (indicated by arrow 133), and to combust the first mixture 132 in the oxidant 133 to produce heat and a first product. The combustion chamber 120 is configured to output the first product (indicated by arrow 134) from the combustion chamber via the first chamber outlet 122.

The fuel reformer 110 is further configured to receive the first product 134 via the second reformer inlet 115 such that the first reformer temperature of the first channel 111 depends on a temperature of the first product 134 in the second channel 112. The fuel reformer 110 may be configured to output the first product 134 via the second reformer outlet 116. The controller (not shown in FIG. 1) is configured to control operation of the internal combustion engine assembly such that the engine load exceeds a load threshold.

Figure 2:
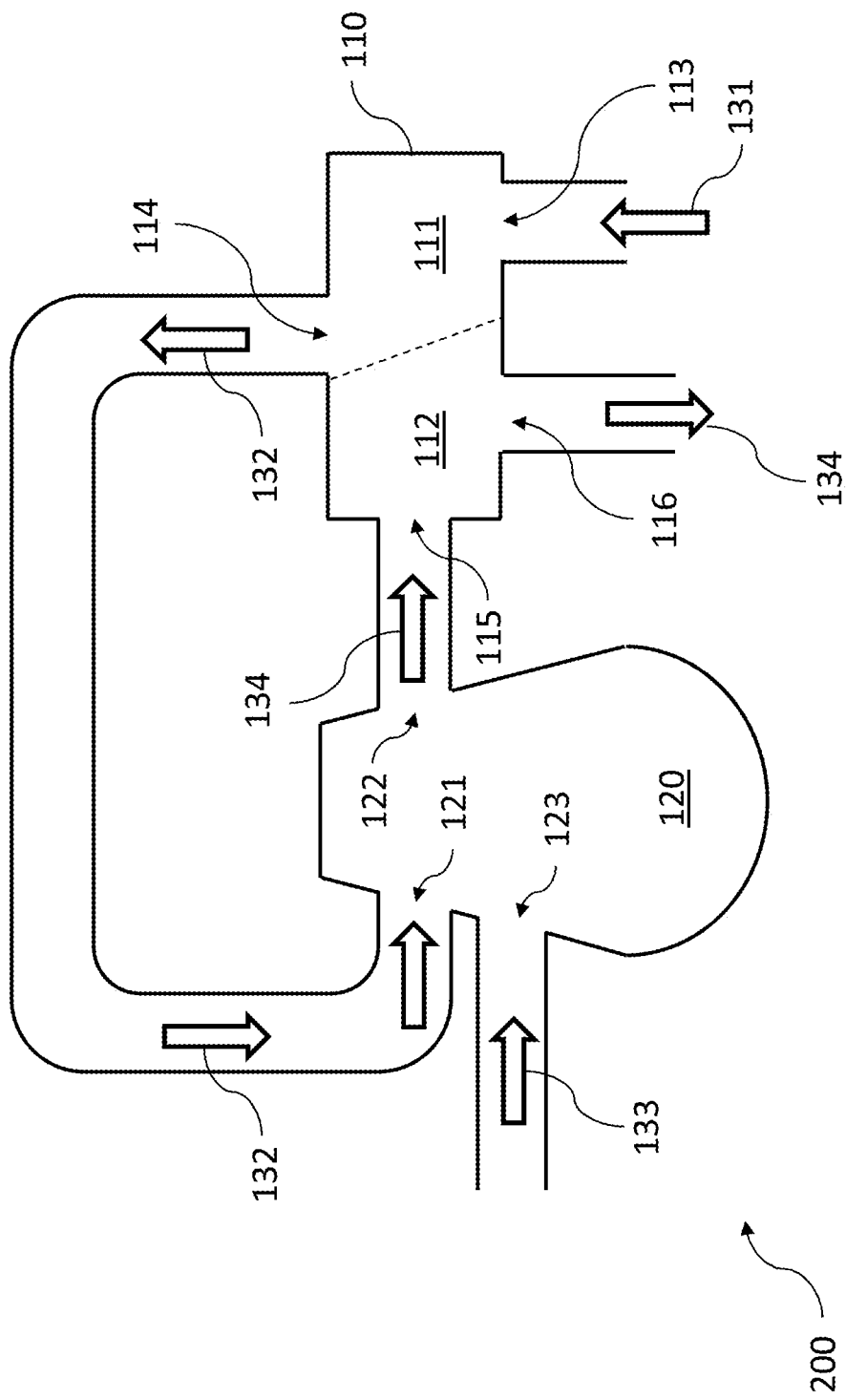
FIG. 2 shows a schematic diagram of an internal combustion assembly according to an embodiment of the present disclosure.

In the embodiment illustrated in FIG. 1, the combustion chamber 120 is configured to receive the first mixture 132 and the oxidant 133 via the first chamber inlet 121. In another embodiment of the internal combustion engine assembly 200, illustrated in FIG. 2, the combustion chamber 120 further comprises a second chamber inlet 123. The combustion chamber 120 is configured to receive the first mixture 132 via the first chamber inlet 121 and to receive the oxidant 133 via the second chamber inlet 123.

Figure 3:
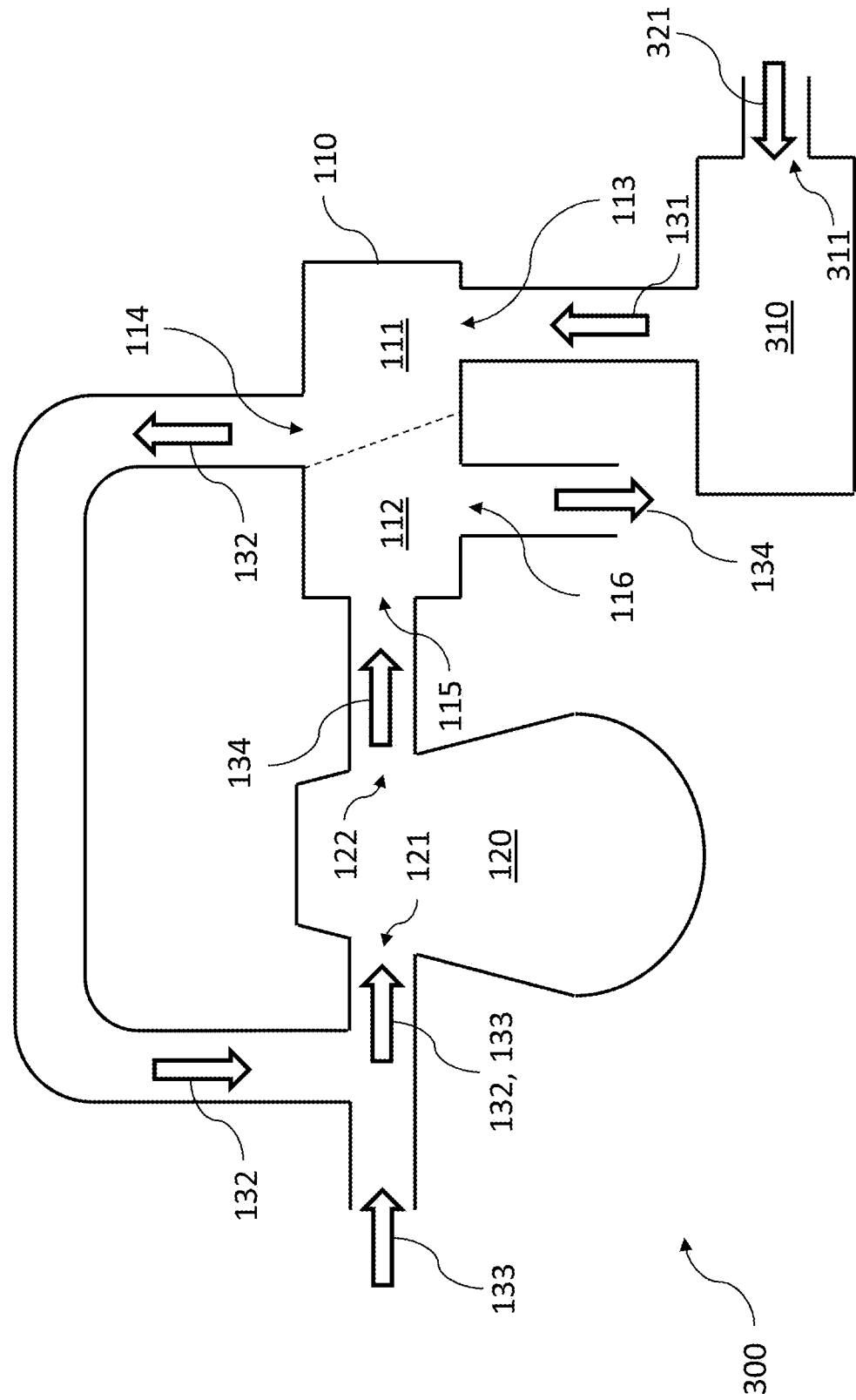
FIG. 3 shows a schematic diagram of an internal combustion assembly further comprising an evaporator according to an embodiment of the present disclosure.

In the first channel 111 of the fuel reformer 110, ammonia is passed over the catalyst to facilitate the reforming of ammonia to nitrogen and hydrogen. The ammonia that is passed over the catalyst comprises gaseous ammonia. The ammonia received by the internal combustion engine assembly 100 may comprise liquid ammonia, and the liquid ammonia may be evaporated prior to reaching the catalyst. The liquid ammonia may be evaporated using an evaporator. With reference to FIG. 3, the internal combustion engine assembly 300 may further comprise an evaporator 310. In an embodiment the evaporator 310 may be configured to receive liquid ammonia 321 via a first evaporator inlet 311. The evaporator 310 may be further configured to evaporate the liquid ammonia and output gaseous ammonia 322, wherein the fuel reformer 110 is configured to receive the gaseous ammonia 322. The evaporator 310 may comprise a heat exchanger, or any other type of evaporator. In an example, the evaporator 310 may comprise a first evaporator channel through which the ammonia may be passed. The first evaporator channel may be heated to evaporate the liquid ammonia 321. The first evaporator channel may be heated by heating a gas or liquid surrounding the first evaporator channel. The first evaporator channel may be heated via heat exchange between a portion of the first evaporator channel and a second evaporator channel configured to contain a gas or liquid. In an embodiment, the second evaporator channel may be configured to contain the first product. At ambient pressure (101.325 kPa), the boiling point of ammonia is −33° C. The liquid ammonia may therefore begin to evaporate prior to the evaporator being heated.

In another embodiment, the fuel reformer 110 may be further configured to evaporate liquid ammonia. For example, a portion of the first channel 111 upstream of the catalyst may be heated. The portion of the first channel 111 upstream of the catalyst may be heated via heat exchange with a portion of the second channel 112.

The first channel 111 comprises a catalyst selected to catalyse the decomposition of ammonia to hydrogen and nitrogen according to the following overall equation:

$$2NH_3 \rightarrow 3H_2 + N_2$$

The decomposition of ammonia may occur in a stepwise sequence of dehydrogenation reactions. The reaction may begin with the adsorption of ammonia onto the catalyst surface. The ammonia is then reformed to nitrogen and hydrogen (a process also referred to as dehydrogenation, cracking or decomposition) and the nitrogen and hydrogen desorb from the catalyst. The reforming step may comprise one reaction step or may comprise more than one reaction step with an intermediary formed after the first reaction step.

The catalyst may comprise an active part. The active part may be selected such that the rate of reforming ammonia to nitrogen and hydrogen is increased. Generally, the active part of the catalyst may comprise a metal. Preferably, the active part of catalyst comprises Ruthenium. In order of activity (from highest to lowest), the active part of the catalyst may comprise any of the following:

$$Ru > Ni > Rh > Co > Ir > Fe > Pt > Cr > Pd > Cu \gg Te, Se, Pb$$

For catalysts comprising precious metals such as Ru, Rh, Ir, Pt or Pd, the cleavage of the nitrogen-hydrogen bond of ammonia may be the rate-determining step. For catalysts comprising non-precious metals such as Fe, Co or Ni, the desorption of nitrogen from the catalyst may be the rate-determining step.

The catalyst may further comprise a structural part, wherein the structural part is configured to support the active part. In an embodiment, the structural part may comprise an aluminiosilicate material or other material. In an embodiment, the structural part may comprise $Al_2O_3$.

The structural part may be configured to support the active part. The active part may be provided on the structural part. For example, the active part may comprise a layer supported on a surface of the structural part. The structural part may be configured to increase a surface area of an exposed surface of the active part, wherein the exposed surface is configured to be exposed to the reactants. In an embodiment, the structural part may comprise a high surface area support media. The high surface area support media may comprise any shape that optimises or increases surface area within a given volume. For example, the structural part may comprise the inner surface of the first channel of the fuel reformer, amorphous $Al_2O_3$, carbon nanotubes, or any other high surface area support media. In an embodiment, the structural part may comprise tubes through which reactants (in this case gaseous ammonia) may pass, wherein the active part is provided on the inner surfaces of the tubes and/or on the outer surfaces of the tubes. The tubes may comprise the first channel, or may comprise carbon nanotubes. In another embodiment the structural part may comprise wedge-shaped structures. The structural part may comprise other shapes of structure with large surface areas.

Promotors may be used to increase activity at lower temperatures. For example, promotors may be used to increase activity below 500° C. An example of a promotor may be $KNO_3$.

The decomposition of ammonia is endothermic, and the rate of decomposition is temperature dependent. In general, the rate of decomposition increases with temperature. The composition of the first mixture may be controlled by adjusting the temperature of the gas passing over the catalyst.

The combustion chamber 120 is configured to burn ammonia, hydrogen, or a mixture of ammonia and hydrogen. Generally, the thermal efficiency of burning ammonia is relatively low. The thermal efficiency tends to increase as the ratio of hydrogen to ammonia in the first mixture increases. To achieve sufficient rates of conversion of ammonia to nitrogen and hydrogen, the target temperature or range of target temperatures may be above 350° C. or preferably above 450° C. A sufficient rate of conversion may be above 10%, or preferably above 40%.

Figure 4:
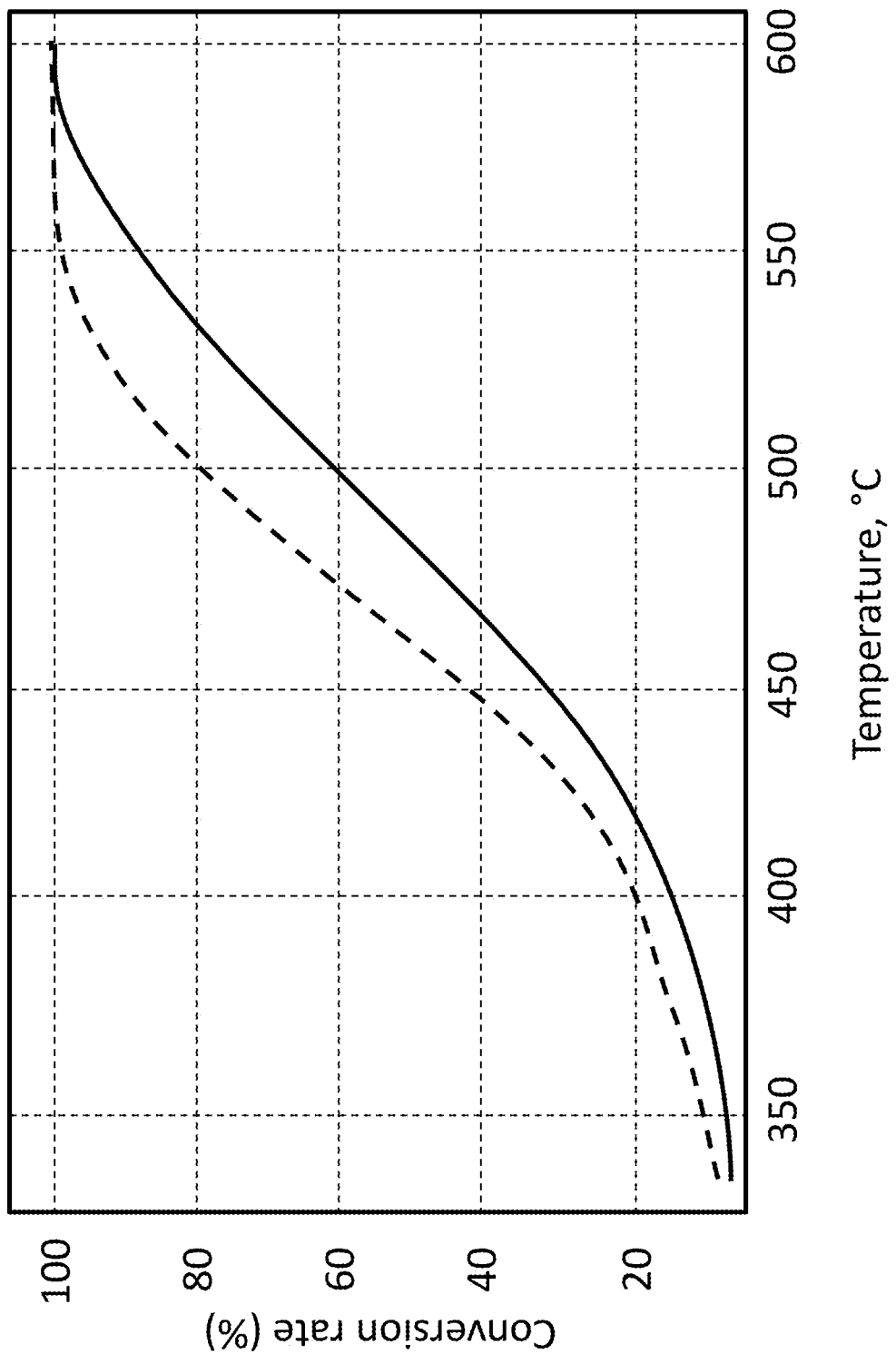
FIG. 4 shows a schematic graph indicating a conversion rate of ammonia to hydrogen and nitrogen plotted against temperature.

With reference to FIG. 4, two schematic curves of conversion rate (as a percentage) against temperature are shown. The curve is intended to show an exemplary shape of the relationship between the conversion rate and temperature. The relationship may vary from that shown, either in shape or numerically. In the example shown, the rate of increase of the conversion rate with temperature is lowest at low and high temperatures. In the example shown with a solid line, the conversion rate of ammonia to nitrogen and hydrogen is >80% above 550° C. and 100% at 600° C. Similar conversion rates may be obtained using a Ruthenium catalyst. In the example shown by the dashed curve, the conversion rate is approximately 10% at 350° C., approximately 20% at 400° C., approximately 40% at 450° C., approximately 80% at 500° C. and reaches close to 100% at 550° C. A similar curve may be achieved by reforming ammonia over a Ruthenium catalyst, which may be supported on $Al_2O_3$. The relationships between conversion rates and temperature may be tailored by adjusting the quantity and surface area of the catalyst.

Figure 5:
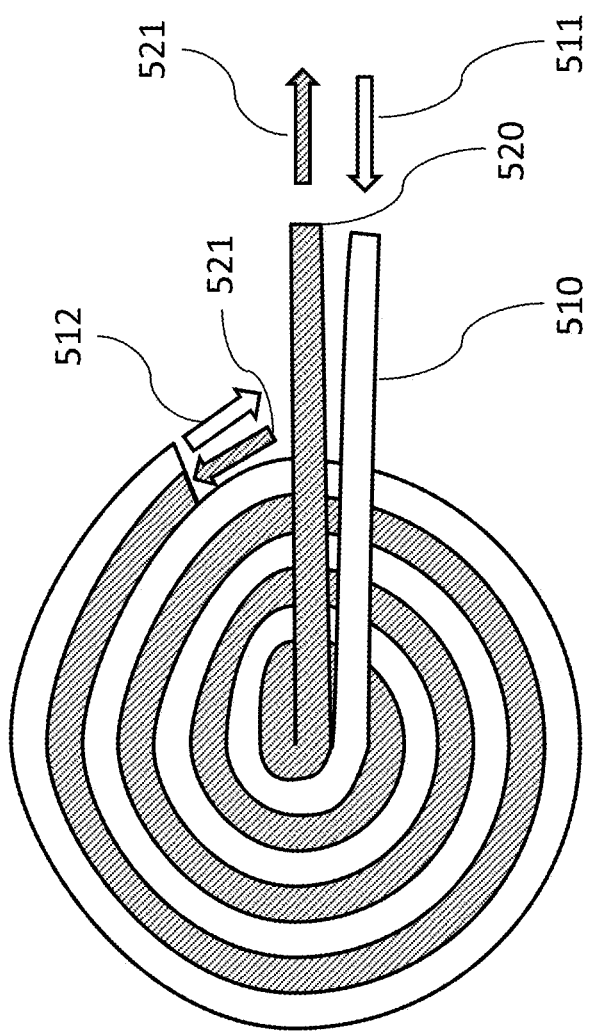
FIG. 5 shows a schematic diagram of a top view of the first channel and the second channel of the fuel reformer according to an embodiment of the present disclosure.

As described, the rate of reforming ammonia to nitrogen and hydrogen is temperature dependent. The composition of the first mixture is, therefore, dependent on the first reformer. The first reformer temperature may comprise the temperature of the catalyst and/or the temperature of the ammonia passing over the catalyst. A first portion of the first channel 111 is heated via heat exchange with a portion of the second channel 112. The portion of the first channel 111 may be adjacent to the portion of the second channel 112, wherein adjacent may mean close to each other or in contact. The geometries of the first channel 111 and the second channel 112 may be configured to increase the length of the portion of the first channel 111 that is adjacent to the portion of the second channel 112. The geometries of the first channel 111 and the second channel 112 may be configured to increase the surface area of the portion of the first channel 111 that is adjacent to the portion of the second channel 112 and the surface area of the portion of the second channel 112 that is adjacent to the first channel 111. With reference to FIG. 5, in an exemplary embodiment the first channel 510 and the second channel 520 (shown with hatching) may be arranged in a spiral. A schematic illustration of a top view of the spiral is shown in FIG. 5. The first channel 510 is configured to receive ammonia 511 and to output the first mixture 512. The second channel 520 is configured to receive the first product 521 and output the first product 521. FIG. 6 shows a schematic of another configuration of a spiral arrangement of first channel 610 and second channel 620. FIG. 6A shows a schematic top view, and FIGS. 6B and 6C show a perspective view. FIGS. 6A, 6B and 6C show a wedge section removed from the spiral to illustrate the cross section. The first channel 610 is configured to receive ammonia 611 and to output the first mixture 612. The second channel 620 is configured to receive the first product 621 and output the first product 621.

Figure 7:
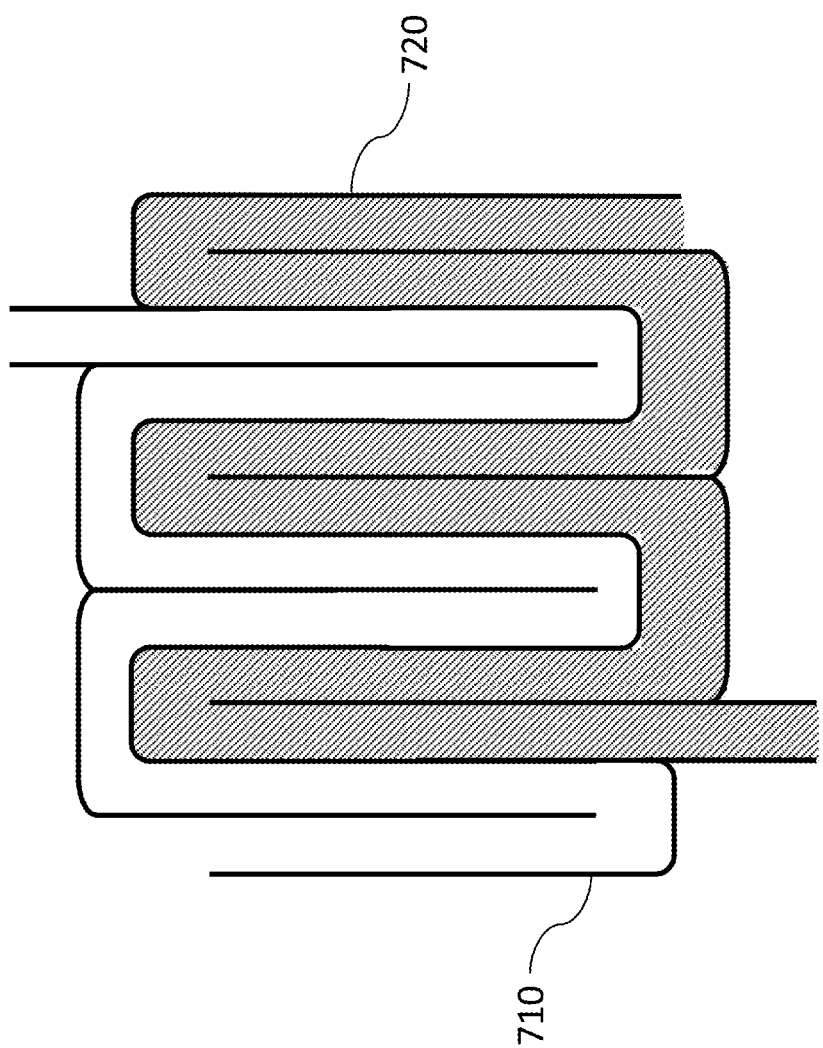
FIG. 7 shows a schematic diagram of the first channel and the second channel of the fuel reformer according to an embodiment of the present disclosure.

The first channel 111 and second channel 112 may have different geometries. Another example is illustrated in FIG. 7, which shows a schematic of a cross-section of the first channel 710 and the second channel 720, wherein the first channel 710 and the second channel 720 are in a folded configuration. In the examples shown in FIGS. 5 to 7, the first channel is in contact with the second channel. In other examples, the first channel may be proximate to the second channel but they may not be in contact. There may be a material between the first channel and the second channel. Other geometries that facilitate heat exchange between a portion of the first channel and a portion of the second channel are possible.

The first reformer temperature may be controlled by adjusting the engine load. Increasing the engine load will increase the temperature of the first product, and decreasing the engine load decreases the temperature of the first product. The controller may be configured to adjust the engine load in order to target a target temperature for the first reformer temperature.

Figure 8:
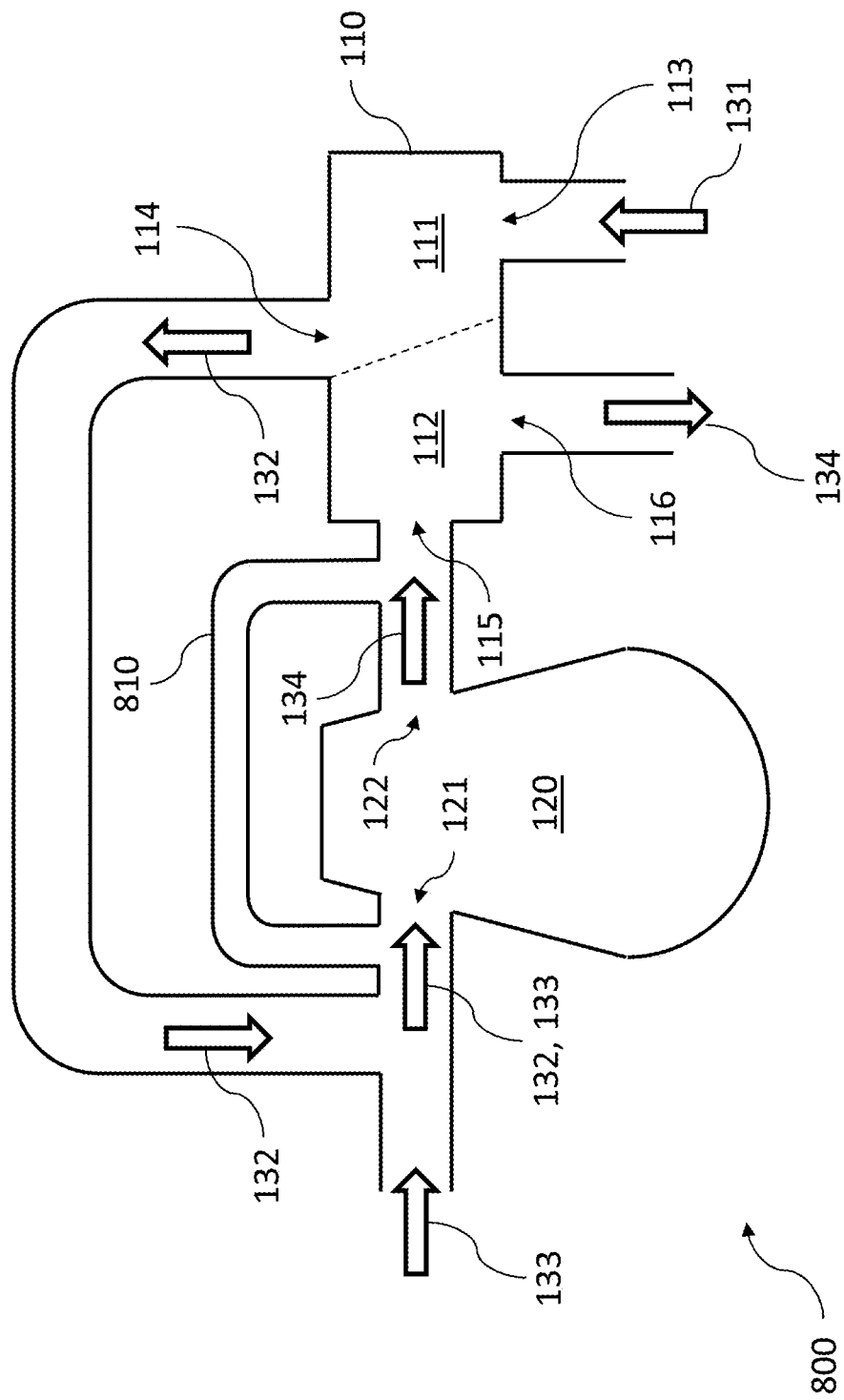
FIG. 8 shows a schematic diagram of an internal combustion assembly according to an embodiment of the present disclosure.

With reference to FIG. 8, the internal combustion engine assembly 800 may further comprise an exhaust gas recirculation circuit including an exhaust gas recirculation valve. The exhaust gas recirculation circuit may comprise an exhaust gas recirculation channel 810. The exhaust gas recirculation circuit may be configured to facilitate returning a portion of the first product to the combustion chamber, reducing the flow of first product received by the second channel of the reformer 110. The controller may be configured to regulate the first reformer temperature by controlling the exhaust gas recirculation valve.

The internal combustion engine assembly may further comprise a wastegate, wherein the controller is configured to regulate the first reformer temperature by controlling the wastegate.

The first reformer temperature may be controlled using one or more of the above methods, or by another method.

The combustion chamber is configured to operate at a load above a threshold. In an embodiment, the threshold may be 50%.

The controller may be further configured to control ignition timing of the combustion chamber. The ignition timing may be adjusted to control fuel consumption, engine performance, emissions and knock. Cylinder pressure of the internal combustion engine assembly may be monitored to determine ignition timing. Ignition timing may comprise spark timing in the event that spark ignition system is used. The spark ignition system may use an Otto cycle. In other embodiments, a corona ignition system or other ignition system may be used.

The controller may be further configured to regulate a ratio of oxidant to fuel in the combustion chamber.

The internal combustion engine assembly may be used in a hybrid vehicle with an electric motor, as a range extender, as a gen set, or for any application which is portable and for which fuel is transported. In the event that the internal combustion engine assembly is used in a vehicle in which it is not the main source of power, for example in a hybrid vehicle or as a range extender, the threshold load may be above 50%.

The ratio of $NH_3$ to $H_2$ in the first mixture may be further controlled by choosing an appropriate size of the reformer or size of the catalyst. Generally, the larger the surface area of the catalyst the higher the ratio of $H_2$ to $NH_3$ in the first mixture.

Figure 9:
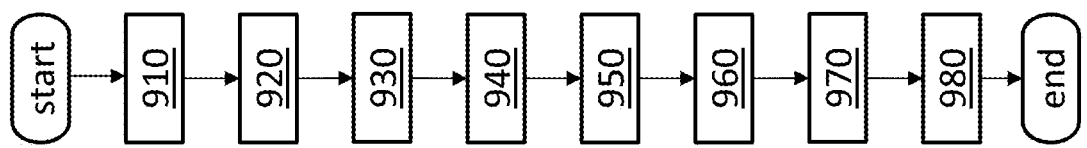
FIG. 9 shows a flow diagram illustrating a method according to an embodiment of the present disclosure.

The ratio of $NH_3$ to $H_2$ affects the fuel consumption of the combustion chamber. A low ratio of $NH_3$ to $H_2$ generally increases fuel consumption With reference to FIG. 9, a method of operating an internal combustion engine comprising a fuel reformer and a combustion chamber and a controller is provided. The fuel reformer comprises a first channel and a second channel, a portion of the second channel being adjacent to a portion of the first channel to facilitate heat exchange between the first channel and the second channel. The first channel comprises a first reformer inlet, a catalyst selected to reform ammonia to hydrogen and nitrogen, and a first reformer outlet. The second channel comprises a second reformer inlet and a second reformer outlet. The combustion chamber comprises a first chamber inlet and a first chamber outlet. At step 910, ammonia is received via the first reformer inlet. At step 920, the ammonia is passed over the catalyst. At step 930, a first mixture comprising ammonia, hydrogen and nitrogen is outputted via the first reformer outlet, wherein the composition of the first mixture depends on a first reformer temperature of the first channel. At step 940, the first mixture from the first reformer outlet is received via the first combustion chamber inlet the first mixture from the first reformer outlet. At step 950, an oxidant is received in the combustion chamber. At step 960, the first mixture is combusted in the oxidant to produce heat and a first product. At step 970, the first product is outputted from the combustion chamber via the first chamber outlet. At step 980, the first product is received via the second reformer inlet such that the first reformer temperature of the first channel depends on a temperature of the first product in the second channel. The controller is configured to control operation of the internal combustion engine assembly such that engine load exceeds a load threshold.

The first product comprises emissions from the combustion chamber. The emissions comprise ammonia ($NH_3$). The emissions may further comprise nitrogen oxides (NOx). The emissions may further comprise one or more of hydrogen, water, oxygen and nitrogen.

Figure 10:
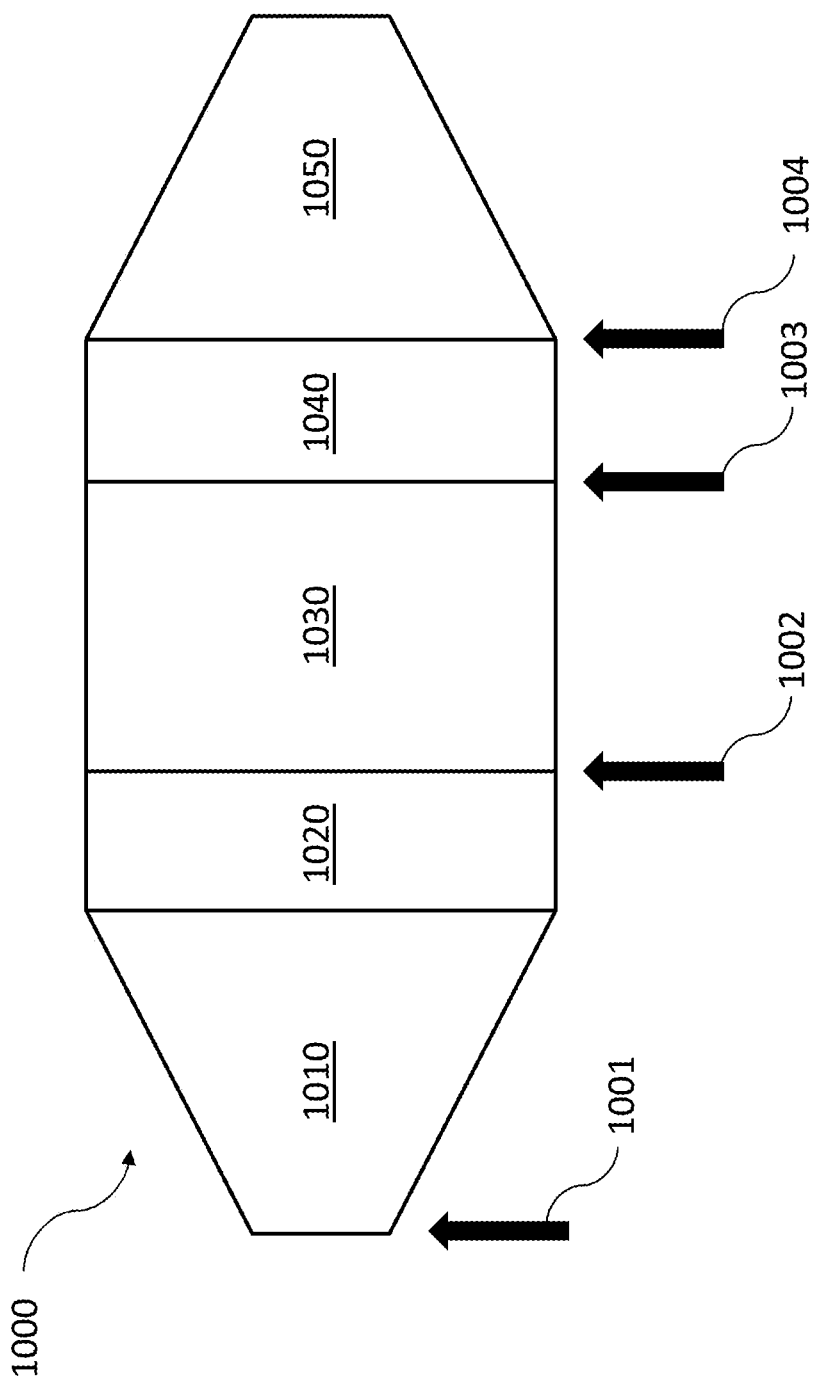
FIG. 10 shows a schematic block diagram illustrating an aftertreatment system in accordance with an embodiment of the present disclosure.

With reference to FIG. 10, an aftertreatment system 1000 may be provided for an internal combustion engine assembly configured to run on fuel comprising ammonia. The aftertreatment system 1000 comprises an aftertreatment inlet 1010; a first catalyst zone 1020 downstream of the aftertreatment inlet 1010; a second catalyst zone 1030 downstream of the first catalyst zone 1020; a third catalyst zone 1040 downstream of the second catalyst zone 1030; and an aftertreatment outlet 1050. A channel for gas flow is formed from the aftertreatment inlet 1010 to the aftertreatment outlet 1050 via the first catalyst zone 1020, the second catalyst zone 1030 and the third catalyst zone 1040.

The first aftertreatment inlet 1010 is configured to receive emissions comprising ammonia. The first catalyst zone 1020 comprises a first ammonia oxidation catalyst configured to oxidise ammonia to nitrogen and water, wherein a first rate of oxidation is dependent on a first temperature of the first catalyst zone 1020. The second catalyst zone 1030 downstream of the first catalyst zone 1020 comprises a first selective catalytic reduction (SCR) catalyst configured to adsorb ammonia, wherein a capacity of the first selective catalytic reduction catalyst to hold adsorbed ammonia is dependent on a second temperature of the second catalyst zone 1030. The third catalyst zone 1040 comprises a second ammonia oxidation catalyst configured to oxidise ammonia to nitrogen and water, wherein a second rate of oxidation is dependent on a third temperature of the third catalyst zone 1040. The aftertreatment outlet 1050 may be configured to output nitrogen and water. The arrows labelled 1001, 1002, 1003 and 1004 will be used in the explanation of FIG. 11 later in the description. Arrow 1001 indicates where gas enters the inlet 1010 in the schematic of the aftertreatment system 1000, arrow 1002 indicates where gas exits the first catalyst zone 1020, arrow 1003 indicates where gas exits the second catalyst zone 1030 and arrow 1004 exits the third catalyst zone 1040.

The oxidation of ammonia may occur according to the following overall equation:

$$4NH_3 + 3O_2 \rightarrow 2N_2 + 6H_2O$$

The reaction may comprise intermediate steps.

The first selective catalytic reduction catalyst may be further configured to react oxides of nitrogen with ammonia. The products may comprise nitrogen and water. As an example, the oxides of nitrogen may react with the ammonia according to the following overall equation:

$$NOx + aNH_3 \rightarrow bN_2 + xH_2O$$

For a given value of x, the relative molar quantities of $NH_3$ and $N_2$ may be $a=2x/3$ and $b=(1+a)/2=(1/2+x/3)$. The reaction may comprise intermediate steps. The rate reaction of NOx with ammonia over the first SCR catalyst may be dependent on the second temperature (generally increasing with the second temperature), but the reaction may occur even at low temperatures. Three key reaction mechanisms of NOx with ammonia over the first SCR catalyst may be as follows:

$$4NO + 3O_2 + 4NH_3 \leftrightarrow 4N_2 + 6H_2O \quad \text{(Standard SCR)}$$

$$NO + NO_2 + 2NH_3 \leftrightarrow 2N_2 + 3H_2O \quad \text{(Fast SCR)}$$

$$6NO_2 + 8NH_3 \leftrightarrow 7N_2 + 12H_2O \quad \text{(Slow SCR)}$$

For the "standard SCR" equation x=1, for the "slow SCR" x=2, and for the "fast SCR" NOx with both x=1 and x=2 is present. The ammonia oxidation may follow the reaction above $(4NH_3 + 3O_2 \rightarrow 2N_2 + 6H_2O)$ and NO oxidation may follow $2NO + O_2 \leftrightarrow 2NO_2$.

The first rate of oxidation may increase with the first temperature over a first temperature range. The capacity of the first selective catalytic reduction catalyst to hold adsorbed ammonia may decrease with the second temperature over a second temperature range. The second rate of oxidation may increase with the third temperature over a third temperature range.

In use, the aftertreatment system starts cold (or at ambient temperature) when the internal combustion engine assembly is started. At cold start, the internal combustion engine assembly starts receiving fuel that is predominantly $NH_3$, resulting in high $NH_3$ emissions. The first and second rates of oxidation (over the first and second ammonia oxidation catalysts respectively) are low, and the capacity of the first selective catalytic reduction catalyst to hold adsorbed ammonia is high.

The emissions heat the aftertreatment system as they pass through the channel. The emissions also heat the fuel reformer, so the ratio of $H_2$ to $NH_3$ in the first mixture increases. The ratio of $NH_3$ to NOx in the emissions generally decreases as the ratio of $H_2$ to $NH_3$ in the first mixture increases. The temperature of the aftertreatment increases, with the first, second and third temperatures increasing in the order in which the emissions reaches the first, second and third catalyst zones respectively.

As the first temperature increases, the rate of oxidation of ammonia by the first ammonia oxidation catalyst increases. The proportion of ammonia that is removed from the emissions by the first catalyst zone increases, and so the proportion of ammonia that reaches the second catalyst zone decreases. As the second temperature increases, the capacity of the first SCR catalyst decreases and so the ammonia begins to slip from the first SCR catalyst. A rate of reaction of NOx with ammonia by the first SCR catalyst may increase with the second temperature over a third temperature range. As the third temperature increases, the rate of oxidation of ammonia by the second ammonia oxidation catalyst increases, so the ammonia that slips from the first SCR catalyst may be oxidised by the second ammonia oxidation catalyst.

With reference to FIG. 11, graphs are shown that illustrate the temperature and gas flow through the aftertreatment system over time. The graphs start (at time=0) when the internal combustion engine assembly is started, so illustrate the behaviour of the aftertreatment system as it warms up. The graphs are the outputs of simulations, and are an example of the behaviour of an aftertreatment system as described herein. The behaviour may differ from that shown, and different starting conditions (emissions composition and temperature, for example) may be used. The following description of FIGS. 11A, 11B, 110, 11D and 11E relates to the example shown.

Figure 11A:
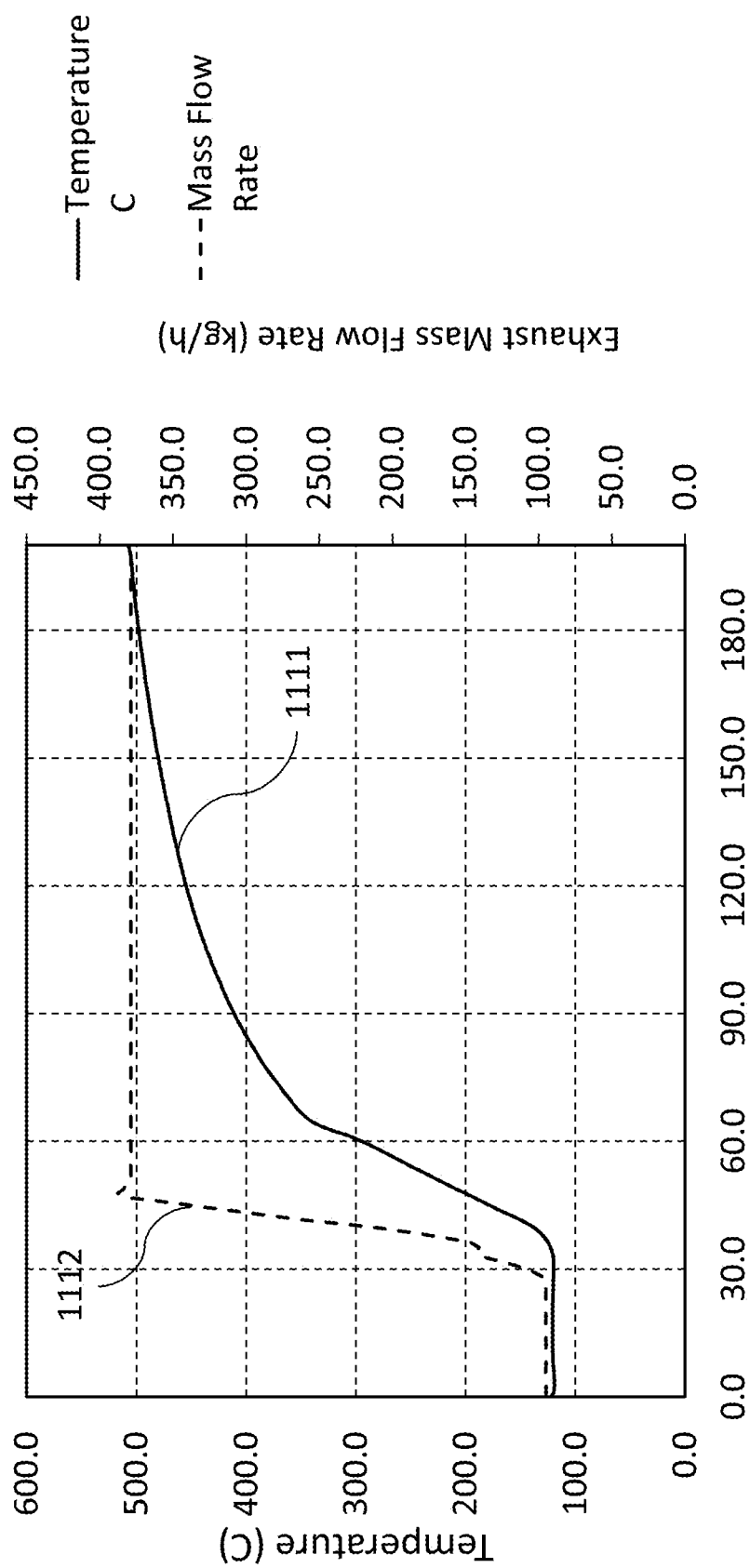
FIG. 11A shows temperature and mass flow rate.

FIG. 11A shows temperature in ° C. (solid line 1111, plotted on the left y axis) and the exhaust mass flow rate in kg/h (dashed line 1112, plotted on the right y axis) against time in seconds. The temperature and flow rate are at the inlet of the aftertreatment system. The temperature varies relatively little at the stary, staying at approximately 120° C. After approximately 35 seconds, the temperature increases with time. The mass flow rate also begins at a roughly constant rate (of approximately 95 kg/hr) before increasing at approximately 30 seconds, and then plateauing at approximately 50 seconds.

Figure 11B:
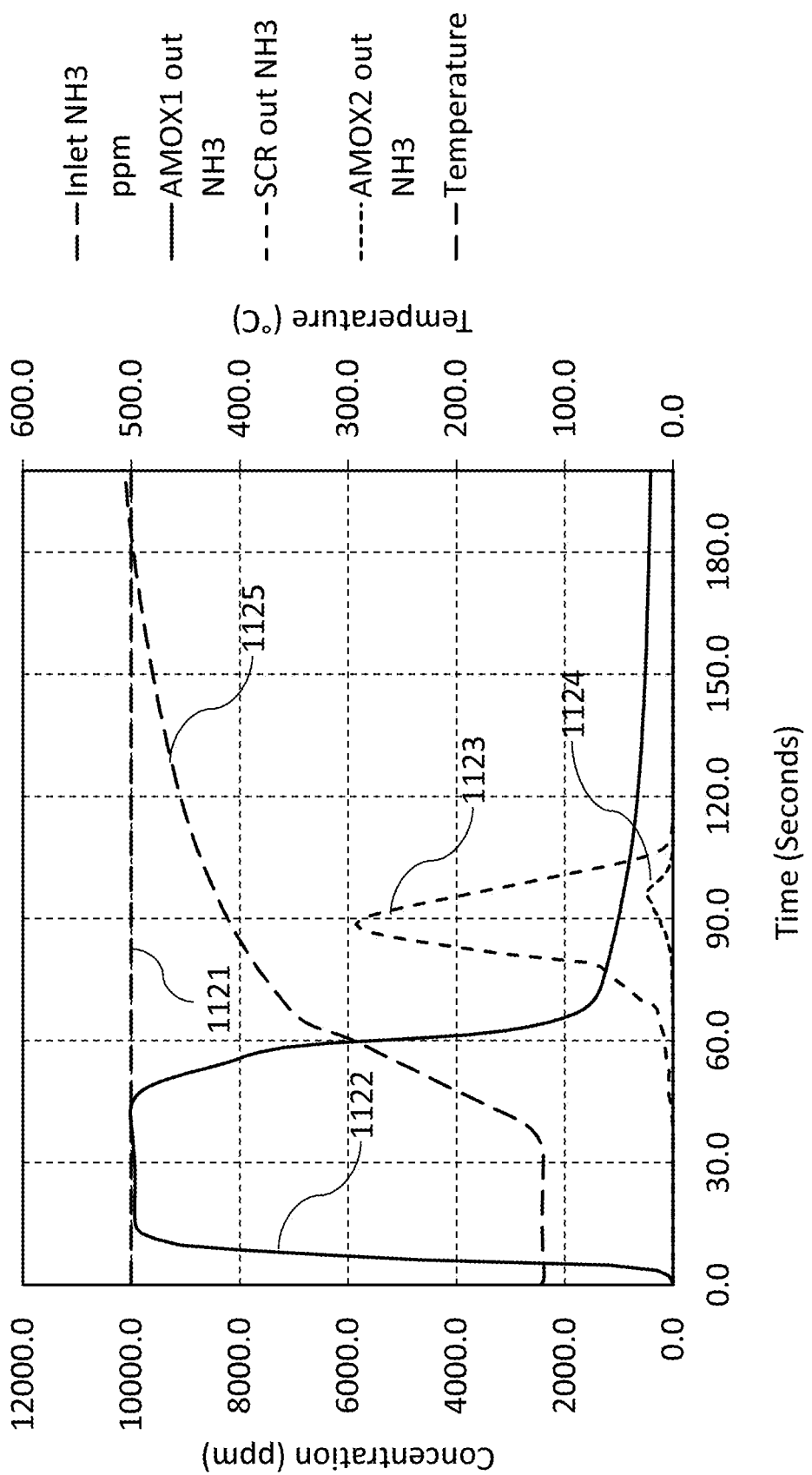
FIG. 11B shows the concentration of ammonia at the inlet, exiting the first catalyst zone, exiting the second catalyst zone and exiting the third catalyst zone.

FIG. 11B shows the concentration in parts per million (ppm) of ammonia ($NH_3$) against time, with the concentration of $NH_3$ plotted on the left y axis. Temperature is plotted on the righty axis (dash-dot line 1125). The dashed line 1121 shows the concentration of $NH_3$ in the emissions entering the inlet 1010 of the aftertreatment system, indicated by arrow 1001 in FIG. 10. The concentration of $NH_3$ entering the inlet 1010 is a constant 10000 ppm in this simulation. The solid line 1122 shows the concentration of $NH_3$ in the gas exiting the first catalyst zone 1020, indicated by arrow 1002 in FIG. 10. The concentration of $NH_3$ exiting the first catalyst zone 1020 initially increases and then is constant at approximately 10000 pm, as the temperature of the first catalyst zone is too low for the first ammonia oxidation catalyst to oxidise the ammonia. As the temperature increases, the first ammonia oxidation catalyst starts to oxidise the $NH_3$ and the concentration of $NH_3$ exiting the first catalyst zone 1020 decreases. The dashed line 1123 shows the concentration of $NH_3$ in the gas exiting the second catalyst zone 1030, indicated by arrow 1003 in FIG. 10. At low temperatures, the first SCR catalyst adsorbs and stores all or most of the $NH_3$ entering the second catalyst zone 1030, so zero or little $NH_3$ exits the second catalyst zone. As the temperature increases, the capacity of the first SCR catalyst to store $NH_3$ reduces and the concentration of $NH_3$ exiting the second catalyst zone 1030 increases. As the concentration of $NH_3$ leaving the first catalyst zone 1020 (and entering the second catalyst zone 1030) decreases the concentration of $NH_3$ leaving the second catalyst zone 1030 may also decrease. As the temperature increases, the rate of reaction of NOx with $NH_3$ increases, so the concentration of $NH_3$ leaving the second catalyst zone 1030 decreases. The dotted line 1124 shows the concentration of $NH_3$ in the gas exiting the third catalyst zone 1040, indicated by arrow 1004 in FIG. 10. The concentration of $NH_3$ exiting the third catalyst zone 1040 is usually zero or close to zero, but increases slightly when a larger concentration of $NH_3$ exits the second catalyst zone (and therefore enters the third catalyst zone).

Figure 11C:
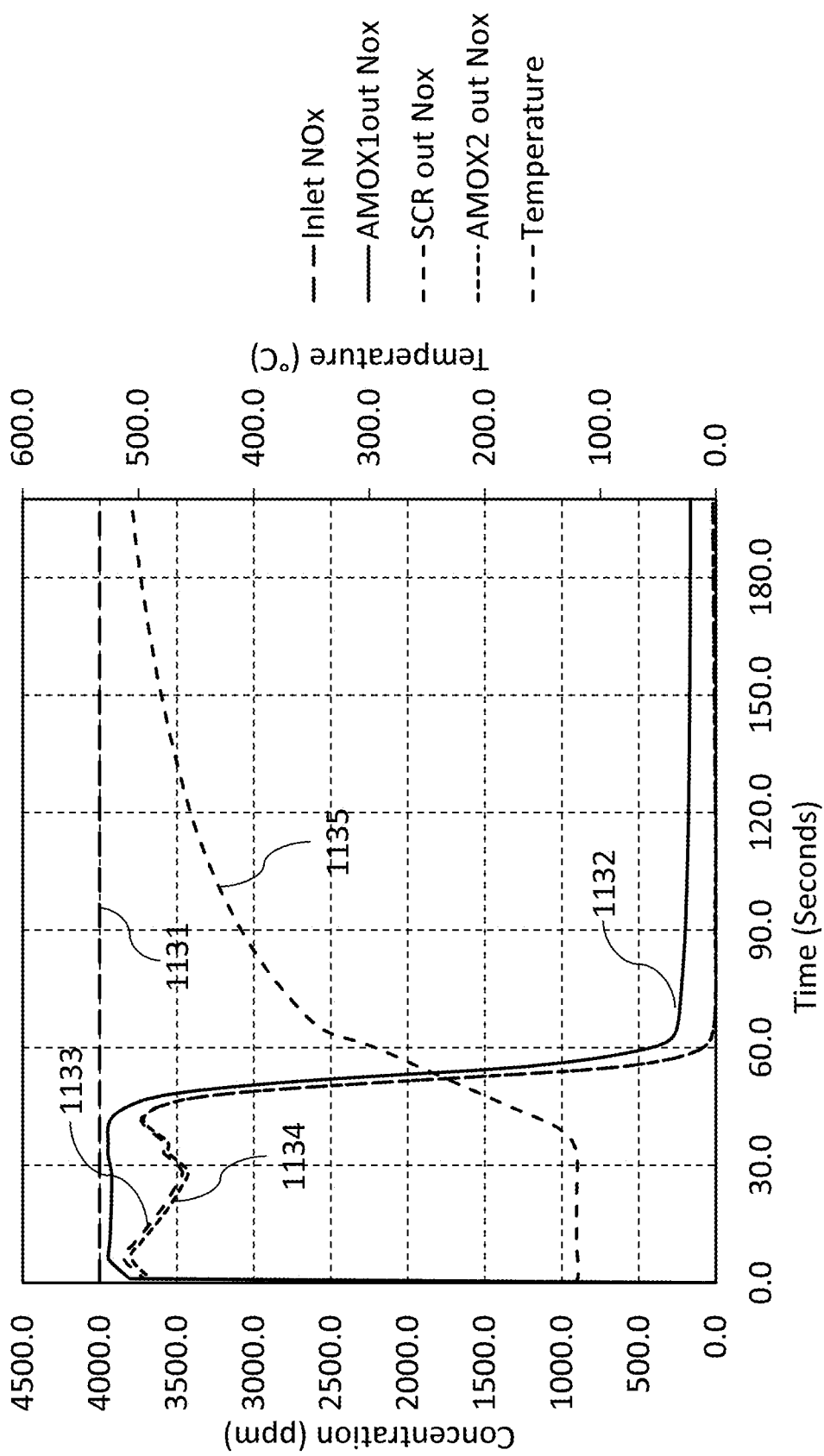
FIG. 11C shows the concentration of NOx at the inlet, exiting the first catalyst zone, exiting the second catalyst zone and exiting the third catalyst.

FIG. 11C shows the concentration in parts per million (ppm) of NOx against time, with the concentration of NOx plotted on the left y axis. Temperature is plotted on the right y axis (dash-dot line 1135). The dashed line 1131 shows the concentration of NOx in the emissions entering the inlet 1010 of the aftertreatment system, indicated by arrow 1001 in FIG. 10. The concentration of NOx entering the inlet 1010 is a constant 4000 ppm in this simulation. The solid line 1132 shows the concentration of NOx in the gas exiting the first catalyst zone 1020, indicated by arrow 1002 in FIG. 10. Dashed line 1133 shows the concentration of NOx in the gas exiting the second catalyst zone 1030, indicated by arrow 1003 in FIG. 10. Dotted line 1134 shows the concentration of NOx in the gas exiting the third catalyst zone 1040, indicated by arrow 1004 in FIG. 10. The reaction of ammonia with NOx in all three catalyst zones increases with temperature, so the concentration of NOx leaving each catalyst zone decreases as temperature increases. The initial decrease then increase of NOx leaving the second and third catalyst zones may be due to availability of ammonia.

Figure 11D:
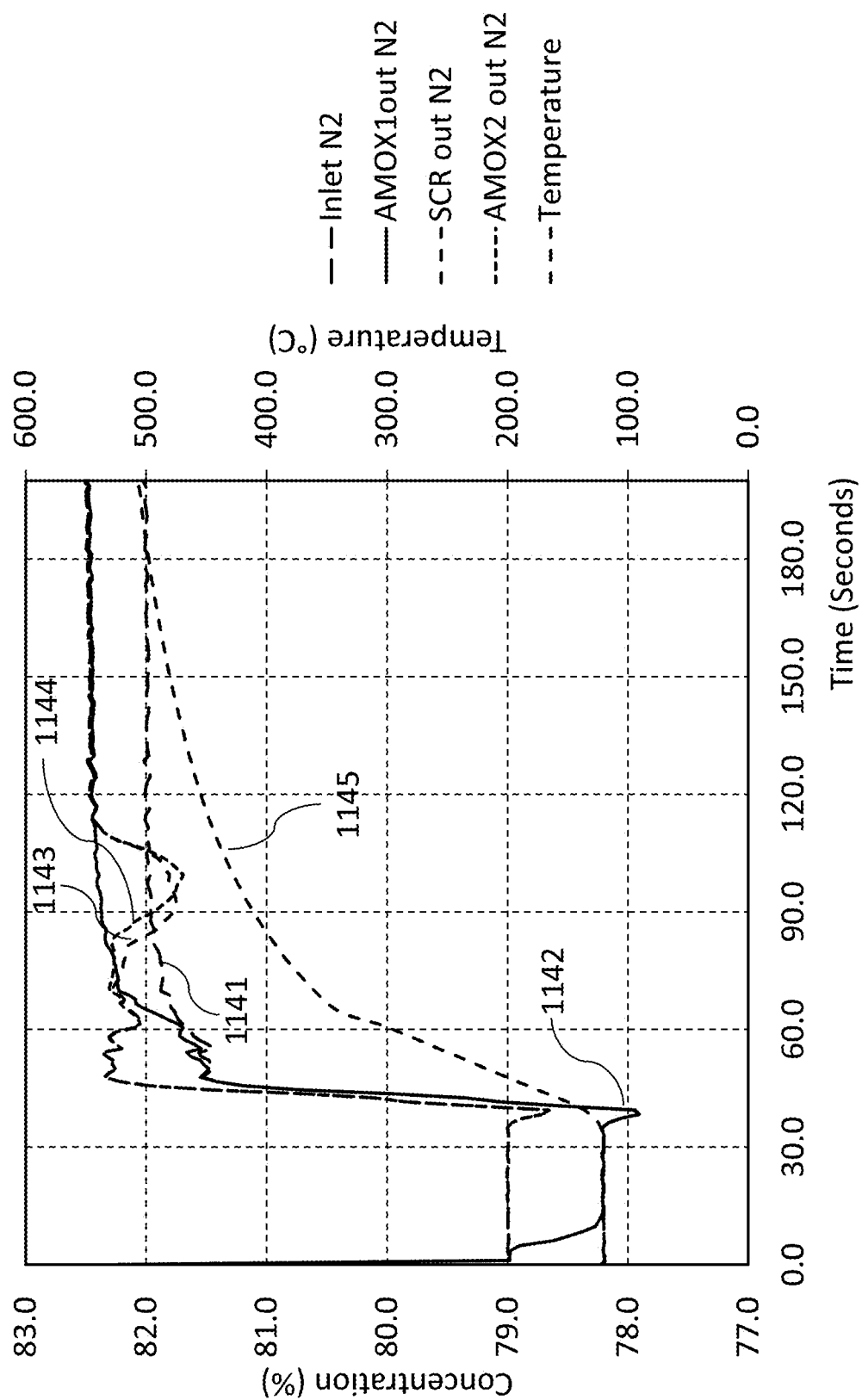
FIG. 11D shows the concentration of $N_2$ at the inlet, exiting the first catalyst zone, exiting the second catalyst zone and exiting the third catalyst zone.

FIG. 11D shows the concentration in percentage of $N_2$ against time, with the concentration of $N_2$ plotted on the left y axis. Temperature is plotted on the right y axis (dash-dot line 1145). The dashed line 1141 shows the concentration of $N_2$ in the emissions entering the inlet 1010 of the aftertreatment system, indicated by arrow 1001 in FIG. 10. In this simulation the concentration of $N_2$ entering the inlet 1010 is initially approximately 79% for approximately the first 43 seconds, before increasing to approximately 82% by approximately 90 seconds. The solid line 1142 shows the concentration of $N_2$ in the gas exiting the first catalyst zone 1020, indicated by arrow 1002 in FIG. 10. Dashed line 1143 shows the concentration of $N_2$ in the gas exiting the second catalyst zone 1030, indicated by arrow 1003 in FIG. 10. Dotted line 1144 shows the concentration of $N_2$ in the gas exiting the third catalyst zone 1040, indicated by arrow 1004 in FIG. 10. FIGS. 11B and 11O show species which are removed by the aftertreatment system, so the concentrations exiting the second catalyst zone are lower than the concentrations exiting the first catalyst zone, and the concentrations exiting the third catalyst zone are lower than the concentrations exiting the second catalyst zone. $N_2$ is a product of the reactions that occur in the aftertreatment system, so after approximately 105 seconds the concentration of $N_2$ exiting each catalyst zone is higher than the concentration of $N_2$ at the inlet.

Figure 11E:
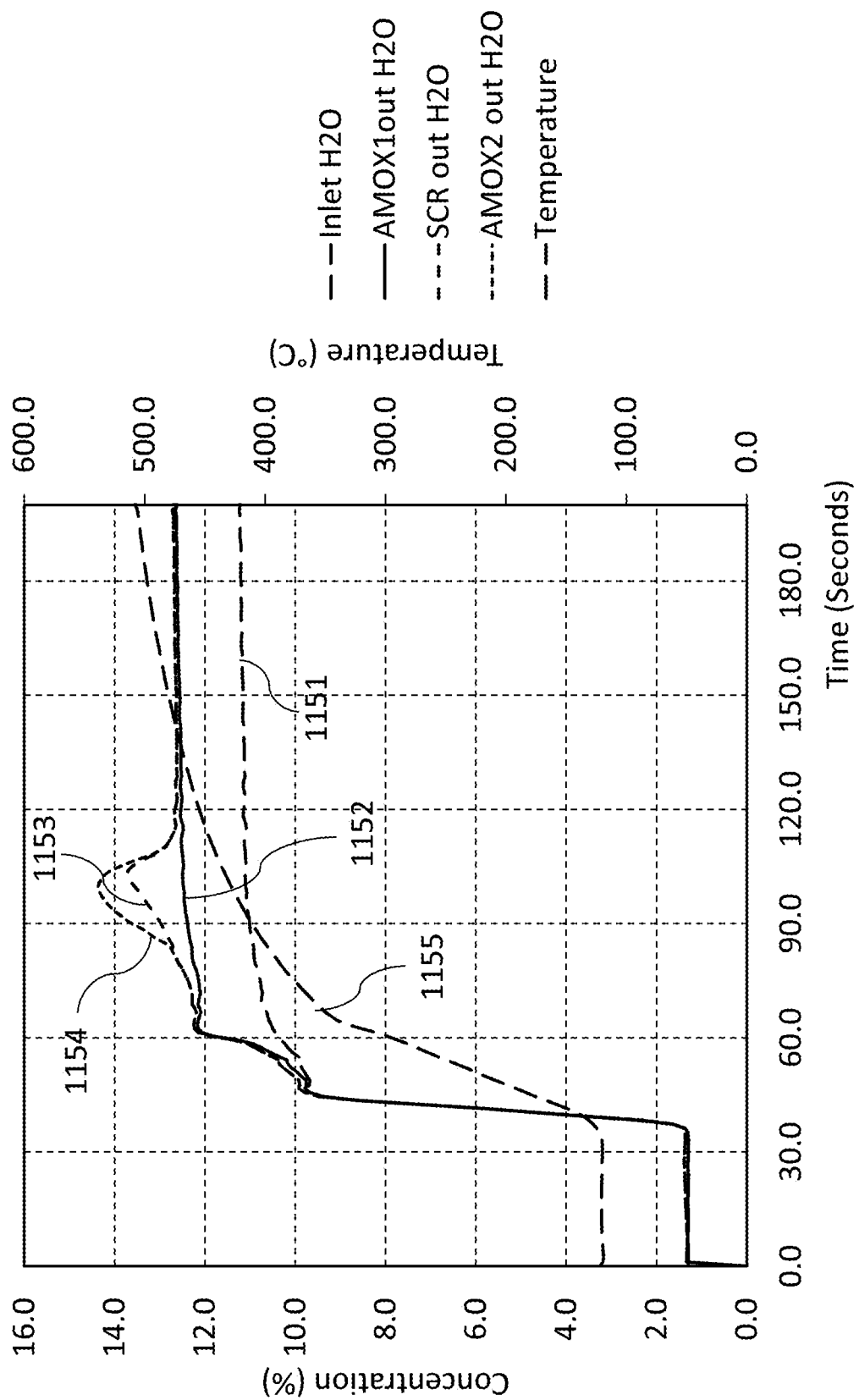
FIG. 11E shows the concentration of $H_2O$ at the inlet, exiting the first catalyst zone, exiting the second catalyst zone and exiting the third catalyst zone.

FIG. 11E shows the concentration in percentage of $H_2O$ against time, with the concentration of $H_2O$ plotted on the left y axis. Temperature is plotted on the right y axis (dash-dot line 1155). The dashed line 1151 shows the concentration of $H_2O$ in the emissions entering the inlet 1010 of the aftertreatment system, indicated by arrow 1001 in FIG. 10. In this simulation the concentration of $H_2O$ entering the inlet 1010 is initially approximately 1.3% for approximately the first 35 seconds, before increasing to approximately 11% by approximately 90 seconds. The solid line 1152 shows the concentration of $H_2O$ in the gas exiting the first catalyst zone 1020, indicated by arrow 1002 in FIG. 10. Dashed line 1153 shows the concentration of $H_2O$ in the gas exiting the second catalyst zone 1030, indicated by arrow 1003 in FIG. 10. Dotted line 1154 shows the concentration of $H_2O$ in the gas exiting the third catalyst zone 1040, indicated by arrow 1004 in FIG. 10.

As described above, the ratio of $H_2$ to $NH_3$ in the first mixture affects the ratio of $NH_3$ to NOx in the emissions. The ratio of $NH_3$ to NOx in the emissions generally decreases as the ratio of $H_2$ to $NH_3$ in the first mixture increases. The composition of the first mixture may be adjusted (by controlling the temperature of the first product, as described above) in order to control the ratio of $NH_3$ to NOx in the emissions. Controlling the ratio of $NH_3$ to NOx in the emissions may allow the reactants for the reaction of NOx with $NH_3$ over the first SCR to be balanced.

A controller may be configured to regulate the air fuel ratio of the internal combustion engine assembly to target a ratio of oxides of nitrogen to ammonia in the emissions. A rich mixture (a low air fuel ratio) may result in low levels of NOx in the emissions. A lean mixture (a high air fuel ratio) may result in high levels of NOx in the emissions. The ammonia levels in the emissions are similar for rich and lean mixtures.

The first ammonia oxidation catalyst and the second ammonia oxidation catalyst may comprise $Pt-Al_2O_3$. The first SCR catalyst may comprise a metal-Zeolite. The first SCR catalyst may comprise Cu-Zeolite or Fe-Zeolite. Synthetic zeolite comprises an aluminosilicate material of tailored structure and porosity. The zeolite may comprise a Chabazite (Cu-CHA) such as SSZ-13. The zeolite may comprise a Beta zeolite or ZSM-5.

Figure 13:
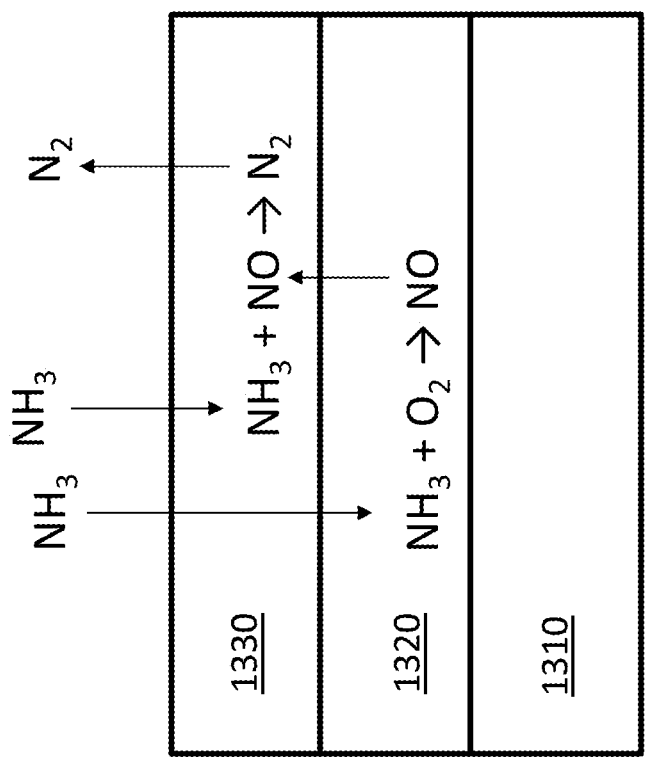
FIG. 13 shows a schematic of an SCR catalyst layered on an ammonia oxidation catalyst according to an embodiment of the present disclosure.

In an embodiment, the first catalyst zone, second catalyst zone and third catalyst zone may be separate catalysts. In another embodiment, with reference to FIG. 12, the aftertreatment system may comprise a substrate 1210 with a plurality of coatings. The aftertreatment system may comprise a coating of the first ammonia oxidation catalyst 1220 in the first catalyst zone, a coating of the first SCR catalyst 1230 in the second catalyst zone and a coating of the second ammonia oxidation catalyst 1240 in the third catalyst zone. With reference to FIG. 12B, the coating of the first SCR catalyst 1230 may extend over the first ammonia oxidation catalyst 1220 and the second ammonia oxidation catalyst 1240. FIG. 13 illustrates a reaction for an SCR catalyst 1330 layered on an ammonia oxidation catalyst 1320 on a substrate 1310. The SCR catalyst 1330 and the ammonia oxidation catalyst 1320 both receive ammonia. The ammonia oxidation catalyst 1320 oxidises the ammonia with oxygen to produce NO. the SCR catalyst 1330 reacts the ammonia with the NO from the ammonia oxidation catalyst 1320 to produce $N_2$.

The first aftertreatment inlet may comprise a first end to receive gas and a second end to output gas. The surface area of the first end may be larger than the surface area of the second end, so that the gas received can be increased and the gas incident on the first catalyst zone is incident in a more uniform distribution. For example, the first aftertreatment inlet may comprise a cone shape.

A method of aftertreatment for an internal combustion engine assembly configured to run on fuel comprising ammonia may be provided. An aftertreatment system comprises an aftertreatment inlet. The aftertreatment system further comprises a first catalyst zone downstream of the aftertreatment inlet, the first catalyst zone comprising a first ammonia oxidation catalyst. The aftertreatment system further comprises a second catalyst zone downstream of the first catalyst zone, the second catalyst zone comprising a first selective catalytic reduction catalyst configured to adsorb ammonia. The aftertreatment system further comprises a third catalyst zone downstream of the second catalyst zone, the third catalyst zone comprising a second ammonia oxidation catalyst. The aftertreatment system further comprises an aftertreatment outlet. A channel for gas flow is formed from first aftertreatment inlet to the aftertreatment outlet via the first catalyst zone, the second catalyst zone and the third catalyst zone. The method comprises receiving emissions comprising ammonia via the aftertreatment inlet. The method further comprises oxidising ammonia to nitrogen and water using the first ammonia oxidation catalyst, wherein a first rate of oxidation is dependent on a first temperature of the first catalyst zone. The method further comprises adsorbing ammonia using the first selective catalytic reduction catalyst, wherein a capacity of the first selective catalytic reduction catalyst to hold adsorbed ammonia is dependent on a second temperature of the second catalyst zone. The method further comprises oxidising ammonia to nitrogen and water using the second ammonia oxidation catalyst, wherein a second rate of oxidation is dependent on a third temperature of the third catalyst zone.

What is claimed is:

1. An internal combustion engine assembly comprising a fuel reformer and a combustion chamber and a controller, wherein:
   the fuel reformer comprises a first channel and a second channel, a portion of the second channel being in a spiral configuration with a portion of the first channel to facilitate heat exchange between the first channel and the second channel, wherein:
   the first channel comprises a first reformer inlet, a catalyst selected to reform ammonia to hydrogen and nitrogen, and a first reformer outlet; and
   the second channel comprises a second reformer inlet and a second reformer outlet; and
   the fuel reformer is configured to:
      (a) receive ammonia via the first reformer inlet;
      (b) pass the ammonia over the catalyst; and
      (c) output a first mixture comprising ammonia, hydrogen and nitrogen via the first reformer outlet, wherein the composition of the first mixture depends on a first reformer temperature of the first channel;
   the combustion chamber comprises a first chamber inlet and a first chamber outlet; wherein the combustion chamber is configured to:
      (a) receive via the first combustion chamber inlet the first mixture from the first reformer outlet;
      (b) receive an oxidant;
      (c) combust the first mixture in the oxidant to produce heat and a first product; and
      (d) output the first product from the combustion chamber via the first chamber outlet;
   the fuel reformer is further configured to receive the first product via the second reformer inlet such that the first reformer temperature of the first channel depends on a temperature of the first product in the second channel; and
   the controller is configured to control operation of the internal combustion engine assembly such that engine load exceeds a load threshold.

2. The internal combustion engine assembly of claim 1 further comprising an evaporator configured to receive liquid ammonia and to evaporate the liquid ammonia.

3. The internal combustion engine assembly of claim 2 wherein fuel reformer is configured to receive ammonia from the evaporator.

4. The internal combustion engine assembly of claim 2 wherein the fuel reformer comprises the evaporator and wherein the evaporator is heated via heat exchange with the second channel.

5. The internal combustion engine assembly of claim 1 wherein the load threshold is 50%.

6. The internal combustion engine assembly of claim 1 wherein the controller is configured to adjust the engine load in order to target a target temperature for the first reformer temperature.

7. The internal combustion engine assembly of claim 1 further comprising an exhaust gas recirculation circuit including an exhaust gas recirculation valve, wherein the controller is configured to regulate the first reformer temperature by controlling the exhaust gas recirculation valve.

8. The internal combustion engine assembly of claim 1 further comprising a wastegate, wherein the controller is configured to regulate the first reformer temperature by controlling the wastegate.

9. The internal combustion engine assembly of claim 1 further comprising an injector configured to control a rate of ammonia received by the first reformer inlet.

10. The internal combustion engine assembly of claim 1 wherein the catalyst comprises a metal.

11. The internal combustion engine assembly of claim 1 wherein the catalyst comprises Ruthenium.

12. The internal combustion engine assembly of claim 1 wherein a target temperature for the fuel reformer temperature exceeds 350° C.

13. The internal combustion engine assembly of claim 1 wherein the controller is configured to control spark timing of the combustion chamber.

14. The internal combustion engine assembly of claim 1 wherein the controller is configured to regulate a ratio of oxidant to fuel in the combustion chamber.

15. A method of operating an internal combustion engine comprising a fuel reformer and a combustion chamber and a controller, wherein:
   the fuel reformer comprises a first channel and a second channel, a portion of the second channel being in a spiral configuration with a portion of the first channel to facilitate heat exchange between the first channel and the second channel;
   the first channel comprises a first reformer inlet, a catalyst selected to reform ammonia to hydrogen and nitrogen, and a first reformer outlet; and
   the second channel comprises a second reformer inlet and a second reformer outlet; and
   the combustion chamber comprises a first chamber inlet and a first chamber outlet;
   the method comprising:
      (a) receiving ammonia via the first reformer inlet;
      (b) passing the ammonia over the catalyst; and
      (c) outputting a first mixture comprising ammonia, hydrogen and nitrogen via the first reformer outlet, wherein the composition of the first mixture depends on a first reformer temperature of the first channel;

(d) receiving via the first combustion chamber inlet the first mixture from the first reformer outlet;
(e) receiving in the combustion chamber an oxidant;
(f) combusting the first mixture in the oxidant to produce heat and a first product;
(g) outputting the first product from the combustion chamber via the first chamber outlet; and
(h) receiving the first product via the second reformer inlet such that the first reformer temperature of the first channel depends on a temperature of the first product in the second channel; and
wherein the controller is configured to control operation of the internal combustion engine assembly such that engine load exceeds a load threshold.

* * * * *